United States Patent
Jamali et al.

(10) Patent No.: US 6,308,052 B1
(45) Date of Patent: Oct. 23, 2001

(54) HALF-DUPLEX RADIOS FOR INDICATING SIGNAL TRANSMISSIONS

(75) Inventors: Imran A. Jamali, 858 N. Tamarisk Ct., Chandler, AZ (US) 85224; Rami H. Khatib, Huntington Beach, CA (US)

(73) Assignee: Imran A. Jamali, Chandler, AZ (US)

( * ) Notice: Subject to any disclaimer, the term of this patent is extended or adjusted under 35 U.S.C. 154(b) by 0 days.

(21) Appl. No.: 09/232,382

(22) Filed: Jan. 15, 1999

(51) Int. Cl.[7] .................................................... H04B 1/44
(52) U.S. Cl. ........................ 455/78; 455/227; 455/431; 455/528; 370/276
(58) Field of Search ......................... 455/39, 45, 500, 455/507, 515, 517, 528, 78, 98, 431, 227–229

(56) References Cited

U.S. PATENT DOCUMENTS

| | | | |
|---|---|---|---|
| 3,938,156 | * 2/1976 | Lunden | 455/528 |
| 4,335,468 | 6/1982 | Foster et al. . | |
| 4,494,244 | * 1/1985 | Arndt et al. | 455/78 |
| 4,551,854 | * 11/1985 | Rutty et al. | 455/78 |
| 4,665,560 | * 5/1987 | Lange | 455/249.1 |
| 4,932,071 | * 6/1990 | Arndt et al. | 455/58 |
| 5,396,651 | * 3/1995 | Nitardy | 455/517 |
| 5,426,666 | * 6/1995 | Kato | 455/528 X |
| 5,566,359 | * 10/1996 | Corrigan | 455/78 |

* cited by examiner

*Primary Examiner*—Nay Maung
(74) *Attorney, Agent, or Firm*—Eric K. Satermo

(57) ABSTRACT

A radio for a half-duplex communication system includes a warning circuit for indicating when a transmission of a signal is taking place. The radio includes a transceiver for providing a voice signal, and the warning circuit includes a pulse generator for providing a beacon signal. The voice signal and the beacon signal are combined into a transmitted signal. The warning circuit includes a power splitter for receiving a remote signal from an antenna and for dividing the remote signal into the voice and beacon signals thereof. The power splitter then provides the voice signal to the transceiver. A comparator compares a level of the received beacon signal with a reference and provides an output to an indicator (such as an LED) when the level of the beacon signal is greater than the reference. As such, the indicator illuminates in the presence of a beacon signal. A preferred implementation of the radio is in an air-traffic environment, with each aircraft and a control tower initiating and receiving transmission therewith.

18 Claims, 6 Drawing Sheets

HALF-DUPLEX RADIOS FOR INDICATING SIGNAL TRANSMISSIONS

BACKGROUND OF THE INVENTION

1. Field of the Invention

The present invention relates to communication systems and, more particularly, to communication systems such as two-way radios utilized by air-traffic control towers and pilots.

2. Description of the Related Art

Air-traffic control systems (that is, communications between an airport control tower and aircraft) utilize a communication system known as a half duplex communication system. In such a communication system, two-way communications between the tower and one of many aircraft in the vicinity is on the same voice frequency. In this environment, there are multiple transmitter and receivers operating on the same voice frequency such that each receiver receives every transmission. If more than one aircraft transmits at the same time or if any aircraft transmits during a control-tower transmission, then the received signal to all parties on that frequency will experience interference. In addition, the transmitting parties may not be aware of such interference and will not receive the other transmissions.

In a typical scenario, if no transmissions are occurring and if every radio is in receive mode (i.e., no one is transmitting) at the designated frequency for that flight region, then either one of the pilots or the control tower can initiate a transmission at any time. As soon as any transmission is received and heard, it is expected that no other transmission can be initiated until the airways are clear. However, a transmission may not be heard for one of many conceivable reasons, such as simultaneous transmissions, a noisy aircraft environment, a malfunctioning or intermittent headset, and so on.

The current allocation of control frequencies for air-traffic control is 118 MHz to 136 MHz, which yields a bandwidth of 18 MHz. The 18-MHz bandwidth is currently divided into 720 voice channels of 25 kHz. This current voice-channel bandwidth is expected to be reduced to 8.33 kdHz (i.e., one-third of the current bandwidth). This proposed reduction in the current voice-channel bandwidth would offer the opportunity to implement many enhancements that could contribute to a more dependable and accurate communication environment.

In view of the foregoing, there is a need in the art of half-duplex communication systems or a radio that is able to indicate to a user when a transmission is taking place.

BRIEF SUMMARY OF THE INVENTION

In view of the foregoing, the present invention provides methods and apparatus for visually indicating that a transmission is currently taking place in an air-traffic environment which utilizes a half-duplex communication system. Accordingly, a pilot or an air-traffic controller can easily determine that the airwaves are free for a transmission and can make such a transmission knowing that he or she will not be interrupting a transmission currently taking place between a control tower and other aircraft. In addition, a pilot or an air-traffic controller can determine if another transmission takes place while he or she is currently making a transmission, and, if so, can halt their current transmission and then retransmit when the airwaves are free again to ensure that the transmission is completely received.

According to one aspect of the present invention, a radio for a half-duplex communication system includes an antenna for receiving a remote signal and for transmitting a local signal. The remote signal and the local signal each include a voice signal and a beacon signal. The radio also includes a transceiver for providing the voice signal of the local signal and a warning circuit for providing an indication when a transmission is taking place.

The warning circuit includes a power splitter for receiving the remote signal from the antenna and for dividing the remote signal into the voice signal and the beacon signal thereof. The power splitter then provides the voice signal to the transceiver. The warning circuit also includes a comparator for comparing a level of the received beacon signal with a reference. The comparator provides an output to an indicator (such as an LED) when the level of the beacon signal is greater than the reference. In other words, the indicator illuminates in the presence of a beacon signal. According to a preferred embodiment of the radio, the beacon signal is generated by the warning circuit and mixed with the local voice signal from the transceiver prior to transmission.

Although adaptable to various communication environments such as police and emergency dispatchers, a preferred implementation of the radio of the invention is in an air-traffic environment. Each aircraft, as well as the control tower, in the environment utilizes the radio of the present invention to transmit and receive voice signals. The indicator of each of the radios accordingly illuminated when one of the radios is making a transmission. Each of the pilots and air-traffic controllers therefore knows when the airwaves are busy or free, and can initiate their own transmissions accordingly.

Other objects, features, and advantages of the present invention will become apparent to those skilled in the art from reading the following detailed description taken in conjunction with the accompanying drawings.

DETAILED DESCRIPTION OF THE INVENTION

Figure 1:
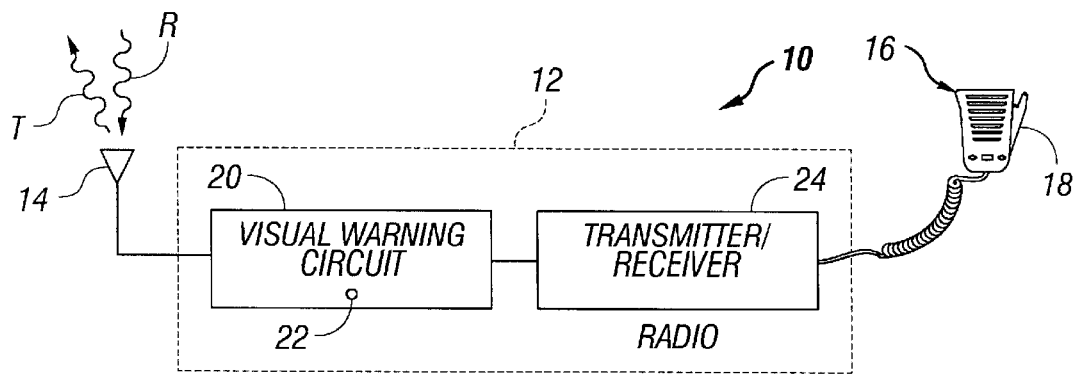
FIG. 1 is a schematic view of a radio, including visual-warning circuitry, configured in accordance with the present invention which visually indicates to a pilot or air-traffic controller that a transmission is taking place.

Referring more particularly to the drawings, an exemplary communication system 10 configured in accordance with the teachings of the present invention is illustrated in FIG. 1. The communication system 10 includes a radio 12 connected to an antenna 14 and a microphone or handset 16 with a switch 18. Voice signals are received (indicated by R) and transmitted (indicated by T) by the antenna 14. Exemplary radio 12 includes visual-warning circuitry 20 with a visual indicator 22, such as a light-emitting diode (LED), and a transmitter/receiver or transceiver 24. The transceiver 24 includes both a transmitter and a receiver, and may be a conventional radio currently available on the market or, alternatively, may be configured in accordance with the art.

Figure 2:
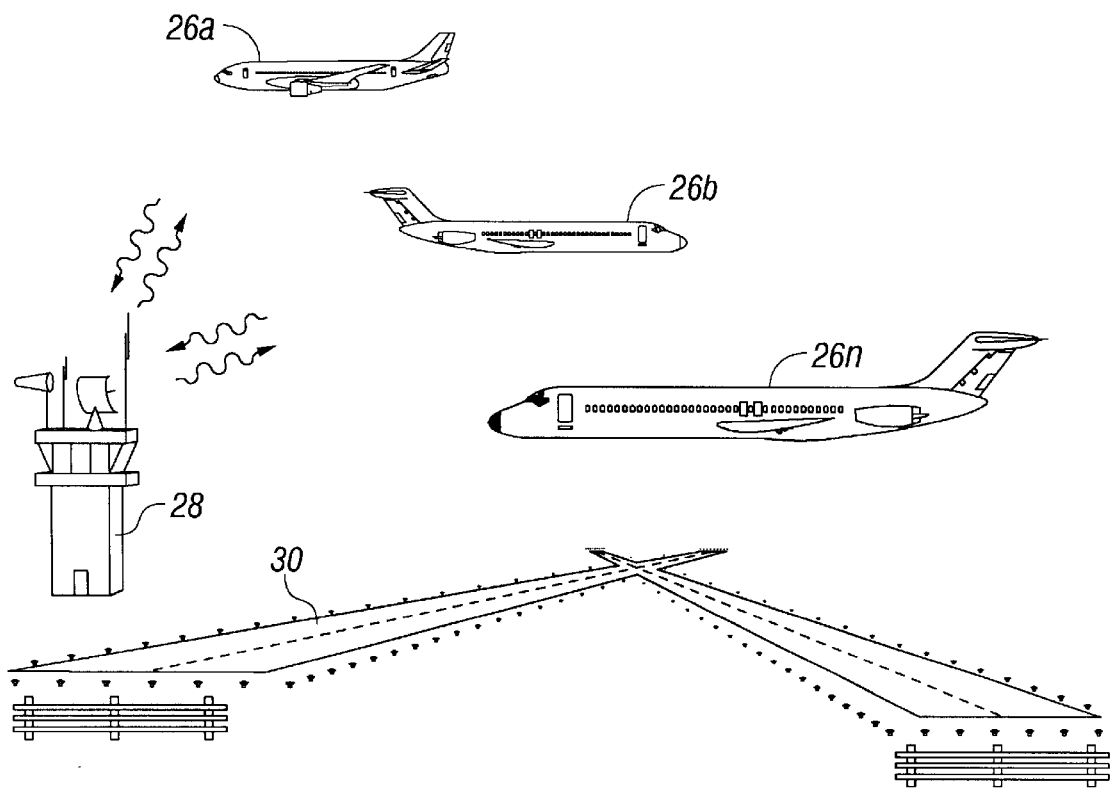
FIG. 2 is a perspective view of an air-traffic environment, including an airport with a control tower and aircraft, in which the radio of present invention is implementable.

With additional reference to FIG. 2, exemplary communication system 10 may be implemented in an air-traffic environment including a number of aircraft 26a, 26b, . . . , 26n and an airport with a control tower 28 and a runway 30. For the purposes of this description, the aircraft will be generally referenced with numeral 26 and specifically referenced with the addition of an alpha suffix, e.g., aircraft 26b. In accordance with the present invention, each of the aircraft 26, as well as the control tower, includes a communication system 10 exemplified in FIG. 1.

As mentioned above, the handset 16 of the communication system 10 includes a switch 18 which a pilot in one of the aircraft 26 or an air-traffic controller in the control tower 28 activates, for example, by depressing, to initiate a transmission. When the switch 18 is activated, the radio 12 is in transmit mode, meaning that a pilot is speaking with an air-traffic controller or vice versa, or with a pilot in another plane. When the switch is not activated, the radio 12 is in receive mode, meaning a pilot or an air-traffic controller (generally speaking, a user) is listening to a transmission or is able to receive a transmission.

As known in the art, air-traffic communication systems utilize a half-duplex communication technique in which one user is able to speak (i.e., transmit) at any given time, with the other users listening (i.e., receiving). If two users attempt to transmit at any given time (i.e., two users are in transmit mode), then both of the transmissions may be unreceivable (i.e., audibly incoherent) by the users in receive mode. In accordance with the present invention, exemplary visual-warning circuit 20 illuminates the indicator 22 when a transmission by any of the aircraft 26 or by the control tower 28 is taking place, thereby providing a warning to a pilot or an air-traffic controller that a transmission is taking place. The pilot or the controller then knows that he or she needs to wait until the transmission currently taking place is completed, which is indicated by the indicator 22 going off, before beginning their own transmission.

If two or more users are waiting to make a transmission while a transmission is currently taking place (indicated by their indicators 22 being illuminated) and begin transmitting as soon as the indicator 22 goes off, then both of their transmissions may be undetected by the control tower or other listening parties. However, in accordance with the present invention, if such a situation occurs, that is, if two or more users initiate simultaneous transmissions, then the indicators 22 of the radios 12 of those users will illuminate, thereby providing warning to the user that his or her transmission may have been unreceivable. Knowing that the transmission may not have been received by the intended recipient, the user can wait until no transmissions are taking place and then re-send his or her transmission.

As mentioned above, the 18-MHz bandwidth between 118 MHz to 136 MHz is allocated for air-traffic control frequencies. The 18-MHz bandwidth is divided into 720 voice channels of 25 kHz each, with this 25-kHz bandwidth expected to be reduced by one-third to 8.33 kHz. In accordance with the present invention, two 8.33-kHz channels are allocated for each communication channel. Thus, the 18-MHz bandwidth of the control-tower frequency allocation provides 1,080 voice channels. For each communication channel, one 8.33-KHz band is used as a voice channel for audio transmissions, and the other 8.33-KHz band is reserved as a service band or channel. The service channel corresponds to its paired voice channel and is utilized in exemplary visual-warning circuit 20 to indicate an interfering simultaneous transmission, which will be discussed in more detail below. Although the exemplary frequencies provided above correspond to the preferred aircraft embodiment described herein, those skilled in the art will appreciate that the values of the frequencies (i.e., the carrier frequency, the offset frequency, etc.) at which the communication system 10 operates may be modified to correspond to a particular operating environment.

Exemplary visual-warning circuitry 20 is described below in relation to three scenarios: when the radio 12 is in receive mode and no transmission is taking place, when the radio is in receive mode and a transmission is taking place, and when the radio is in transmit mode and another transmission is simultaneously received.

Receive Mode—No Transmissions

Figure 3:
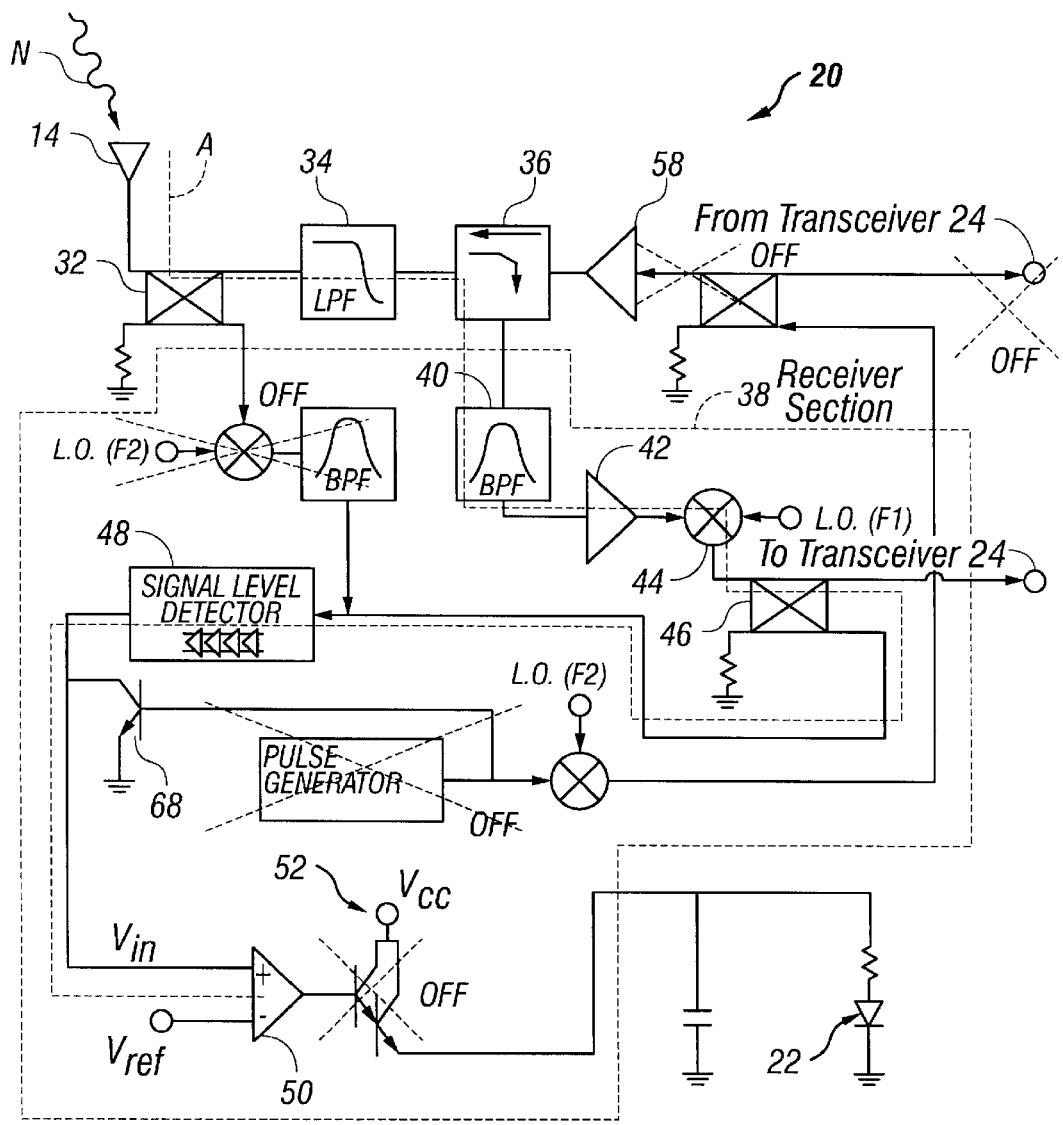
FIG. 3 is a schematic view of exemplary visual-warning circuitry of the present invention, particularly illustrating the circuitry in receive mode when no transmission is taking place.

Width continued reference to FIG. 1 and with additional reference to FIG. 3, the operation of exemplary visual-warning circuit 20 is illustrated when the radio 12 is in receive mode but when no transmissions are taking place.

A signal, such as noise, is received by the antenna 14, which is indicated by N. As the received signal is not a normal voice transmission from another communication system 10 in the air-traffic environment, the signal has a low level of power. The flow of the received signal through the circuit 20 is indicated by dashed line A. Portions of the circuit 20 which are not ON under this current condition (i.e., receive mode with no transmission) are crossed out and indicated OFF. The signal passes through a power divider 32 with minimal loss and is filtered by a low-pass filter 34 which eliminates all frequencies from the signal above a predetermined frequency, for example, 136 MHz. This predetermined frequency is the upper limit of the current allocated air-traffic control bandwidth.

The signal is then directed by a switch 36 to a receiver section 38 of the circuit 20. This signal is band limited in frequency by a band-pass filter 40 so that only signals in a predetermined range, for example, from about 118 MHz to about 136 MHz, are present (i.e., all 1,060 channels within the current allocated air-traffic bandwidth). The signal then passes through a low-noise amplifier 42 which increases the level of the signal strength with minimal distortion.

A mixer 44 converts one particular channel of interest to a predetermined intermediate frequency (IF), for example, about 21.4 MHz. The signal is then split in two by a power splitter 46. The splitter 46 provides two outputs, with the output having the greater power being directed to the receiver portion of the transceiver 24. In the present example where the received signal is not a normal voice transmission but rather a noise signal, essentially no signal is provided to the transceiver 24. The other output of the splitter 46, that is, the one with the lesser power (which is no power in the present example), is directed to a signal-level or power detector 48, such as a logarithmic amplifier. These two outputs will be discussed in more detail below.

The power detector 48 provides a DC voltage output (which is indicated $V_{in}$) that is proportional to the power of the signal present at the input of the power detector 48. The DC output voltage $V_{in}$ may vary from, for example, about 0.25 V to 2.5 V, depending upon the level of the signal input to the power detector 48. For example, for an input of about −75 dBm (i.e., 31 picowatts), the output is about 0.25 V; and for an input of about +17 dBm (i.e., 50 mW), the output is about 2.5 V.

The output of the power detector 48 is provided to a comparator 50. The comparator 50 compares signal $V_{in}$ to a preset and fixed reference voltage (Vref). The output of the comparator 50 is provided to a Darlington transistor pair 52, the output of which is, in turn, provided to the visual indicator 22, which, as mention above, may be a light-emitting diode (LED) or other such indicator as known in the art. As the signal received by the antenna 14 is not a normal voice transmission in this condition (i.e., in receive mode with no transmission), the level of signal $V_{in}$ is below the level of the reference voltage $V_{ref}$. The output of the comparator 50 is accordingly 0 volts. With a zero output from the comparator 50, the transistor pair 52 is off, and the indicator 22 is off. With the indicator 22 off, the pilot or the air-traffic controller knows that no transmissions are taking place and that he or she may initiate a transmission if desired.

Receive Mode—Transmission Received

Figure 4:
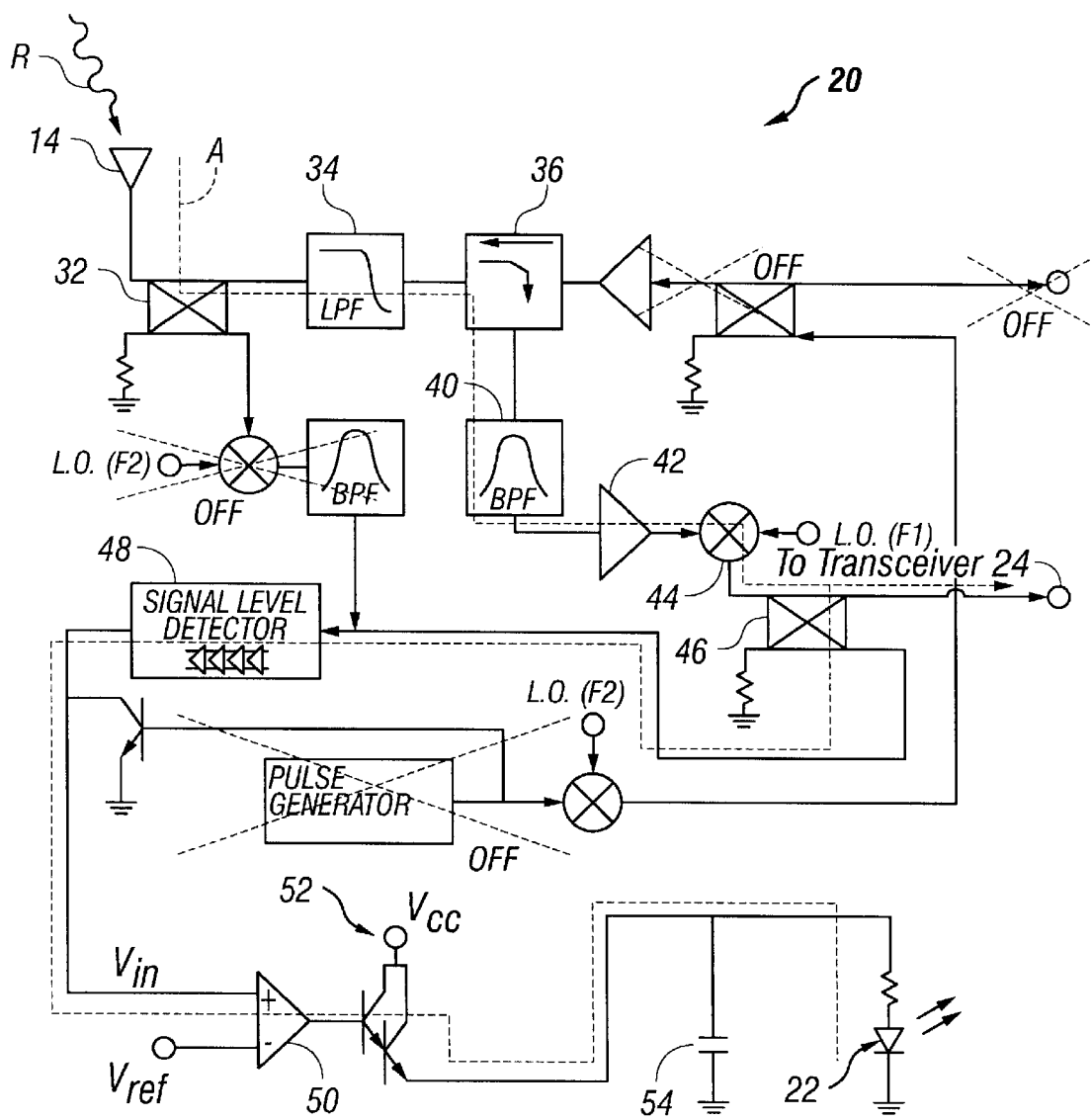
FIG. 4 is a schematic view of the visual-warning circuitry of the invention, particularly illustrating the circuitry in receive mode when a transmission is taking place.

With reference to FIG. 4, when the radio 12 is in receive mode with a voice transmission being received, the following process will activate the visual indicator 22. A voice signal R is received by the antenna 14. The received voice signal passes through the power divider 32 with minimal loss and is filtered by the low-pass filter 34 which eliminates all frequencies above the predetermined frequency equal to the upper limit of the current allocated air-traffic bandwidth (i.e., 136 MHz).

The signal is then directed by the switch 36 to the band-pass filter 40 where it is band limited in frequency so that only signals in the predetermined range equal to the current allocated air-traffic bandwidth (i.e., from 118 MHz to 136 MHz) are present, including all 1,060 channels. The signal then passes through the low-noise amplifier 42 which increases the level of the signal strength with minimal distortion.

The mixer 44 converts one particular channel of interest to the predetermined intermediate frequency (IF). The signal is then split in two by the power splitter 46. As mentioned above, the splitter 46 provides two outputs. One of the outputs is the voice channel, and the other output is the service channel, with the voice channel having greater power than the service channel. The voice channel is provided to the receiver portion of the transceiver 24. The service channel is directed to the power detector 48.

The output signal $V_{in}$ of the power detector 48 is provided to the comparator 50. The comparator 50 compares signal $V_{in}$ to the predetermined reference voltage (Vref). If $V_{in}$ is greater than the reference voltage $V_{ref}$, then the output of the comparator 50 is equal to $V_{cc}$ (for example, about 5 volts). Accordingly, the Darlington transistor pair 52 conducts current, which charges a capacitor 54 and activates the indicator 22 to illuminate. With the indicator 22 on, the pilot or the air-traffic controllers knows that a transmission is taking place. The value of capacitor 54 is preferably selected to maintain the indicator 22 illuminated for some predetermined amount of time, for example, approximately 0.2 second, after the transistor pair 52 turns off to provide some leeway between transmissions.

Transmit Mode—Transmission Received

Figure 5:
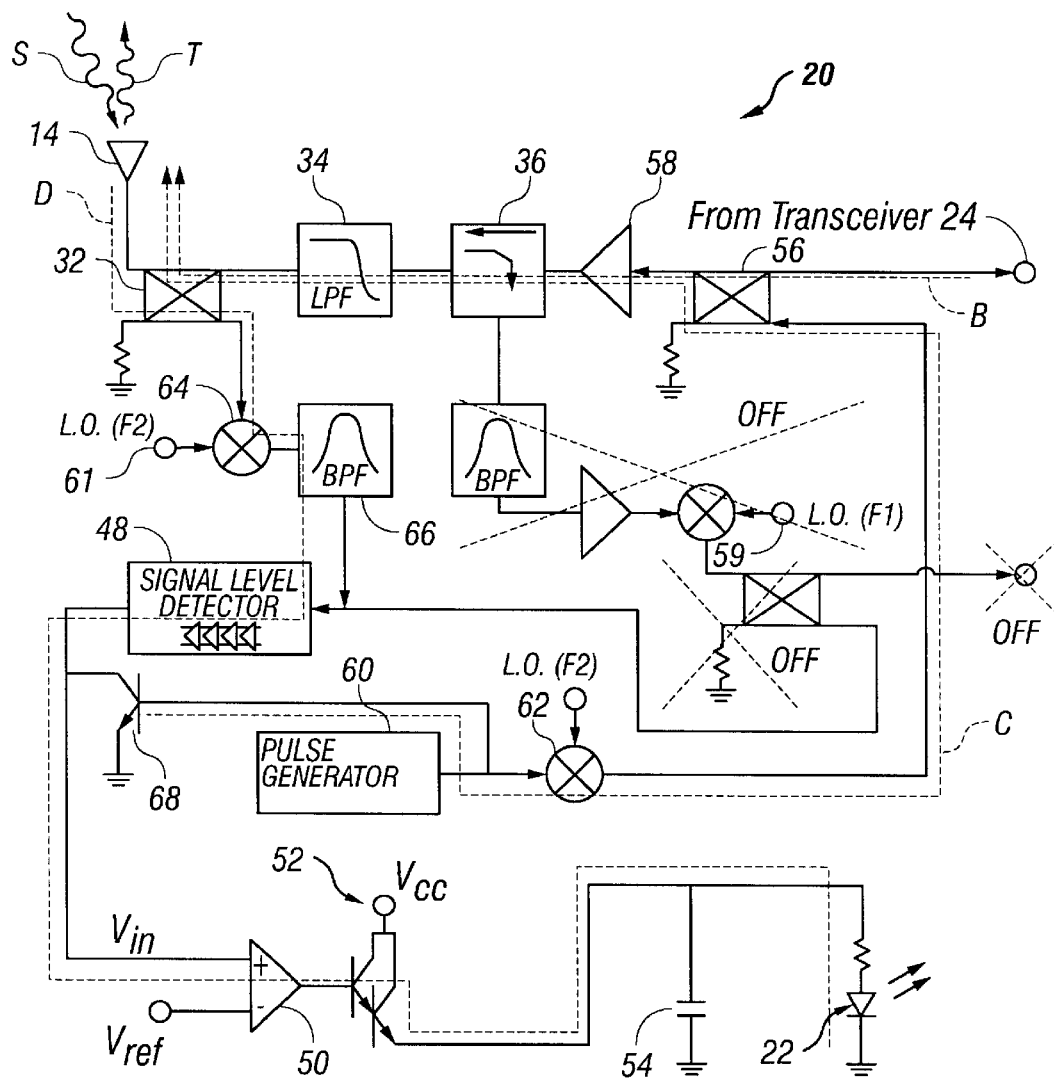
FIG. 5 is a schematic view of the visual-warning circuitry of the invention, particularly illustrating the circuitry in transmit mode when a second transmission occurs simultaneously.

With reference to FIG. 5, the operation of exemplary visual-warning circuit 20 of the present invention is illustrated when the radio 12 is in transmit mode (that is, a user is transmitting a voice signal) and a transmission from another user is simultaneously received.

The voice signal to be transmitted is input to the circuit 20 from the transmitter portion of the transceiver 24 and is sent to the antenna 14. The flow of the signal to be transmitted through the circuit 20 is indicated by dashed line B. Prior to being output by the antenna 14, the voice signal to be transmitted is combined with a beacon signal by a combiner 56. The beacon signal has a predetermined carrier frequency offset of, for example, a fraction of the current allocated voice-channel bandwidth. As mentioned above, the current allocated bandwidth of 18 MHz is expected to be divided into channels of 8.33 kHz each. Accordingly, in connection with such an exemplary embodiment, the predetermined carrier frequency offset of the beacon signal is 8.33 kHz.

Both the beacon signal and the voice signal are amplified by a power amplifier 58, thereafter passing through the switch 36, the low-pass filter 34, and the power splitter 32 en route to the antenna 14. Thus, in accordance with the present invention, the signal T transmitted by exemplary circuit 20 in transmit mode has two components: a voice signal having a carrier frequency off $f_0$ and a beacon signal having a carrier frequency of $f_0$ plus a carrier frequency offset (e.g., $f_0$+8.33 kHz). This sum of the carrier frequency of $f_0$ plus carrier frequency offset will be indicated as the beacon carrier frequency in this description. The carrier frequency $f_0$ of the voice signal is generated by a frequency synthesizer 59, which may be a standard radio frequency synthesizer. The carrier frequency $f_0$ is equal to the frequency of the particular air-traffic environment in which the user is located.

The beacon carrier frequency $f_0$+8.33 kHz is modulated by a random pulse generator 60 and is the next allocated frequency channel from the carrier frequency $f_0$. A second frequency synthesizer 61 similar to the frequency synthesizer 59 used to generate the carrier frequency $f_0$ may be used to generate the beacon carrier frequency $f_0$+8.33 kHz by designating the next channel frequency on the second frequency synthesizer 61 for the beacon carrier frequency. The beacon signal generated by the pulse generator 60 is upconverted by a mixer 62, the flow of which through the circuit 20 is indicated by dashed line C.

In the example situation illustrated in FIG. 3, while transmitting the combination of the voice signal and the beacon signal, the antenna 14 also receives any signal which may have been transmitted by a pilot or an air-traffic controller operating in the air-traffic theater (see FIG. 2). Any signal received by the antenna 14 simultaneously while transmitting a voice signal T (which simultaneously received signal is indicated by S) is directed by the power splitter 32 to a mixer 64.

In accordance with the present invention, any number of pilots and air-traffic controllers in the air-traffic theater are utilizing the communication system 10 of the present invention at any given time. Preferably, each aircraft 26 and each air-traffic controller in the control tower 28 transmits and receives voice signals with exemplary communication system 10. As such, the simultaneously received signal S has a voice signal with a carrier frequency and a beacon signal with a beacon frequency (i.e., the carrier frequency $f_0$ plus the carrier frequency offset). Accordingly, the beacon frequency of the simultaneously received signal S (using the exemplary offset value of 8.33 kHz) is $f_0$+8.33 kHz. This beacon frequency is selected by the mixer 64, thus detecting the beacon signal.

As mentioned, the simultaneously received signal S has a voice signal and a beacon signal. The mixer 64 downconverts the beacon frequency of the beacon signal associated with the voice signal of signal S to the intermediate frequency (IF) of, e.g., 21.4 MHz mentioned above. The simultaneously received signal then passes through a bandpass filter 66 and is detected by the power detector 48. The power detector 48 provides an output voltage $V_{in}$ indicative of the level of the simultaneously received signal, which voltage $V_{in}$ is then compared to the reference voltage $V_{ref}$ by the comparator 50. If the output voltage $V_{in}$ is greater than the reference voltage $V_{ref}$, then this indicates the reception of a beacon signal, and the indicator 22 is activated.

With the indicator 22 illuminating, the transmitting pilot or air-traffic controller knows that another pilot or controller has sent a transmission and that his or her transmission may not have been received due to interference caused by the simultaneous signal. The pilot or controller then knows to retransmit the transmission when the indicator 22 goes off to ensure that the intended receiver has received the transmission. The capacitor 54 maintains the indicator 22 in the ON state long enough for any forthcoming beacon signal to be detected. If no further beacon signal is detected, then the indicator 22 turns off after the capacitor 54 discharges in the predetermined amount of time, e.g., about 0.2 second.

If the received beacon signal corresponds to the beacon signal included in the transmitted signal T, then this indicates that the simultaneously received signal S is the same as the transmitted signal T. In this case, it is not desirable to trigger the alarm or indicator 22. If the beacon signals of the two signals T and S are the same, then a transistor 68 disables the output of the power detector 48 during the outgoing beacon signal from the pulse generator 60. Thus, the pulse width of the beacon signal is preferably short in duration and not synchronized between the radios 12 of the aircraft 26 and the control tower 28 of the air-traffic theater. Accordingly, the pulse generator 60 is preferable a random pulse generator with an approximately 10-millisecond (ms) pulse width to minimize the probability of the beacon signals of the simultaneously received signals S from other radios 12 overlapping with the beacon signal of the transmitted signal T.

Transmission Scenarios

Figure 6:
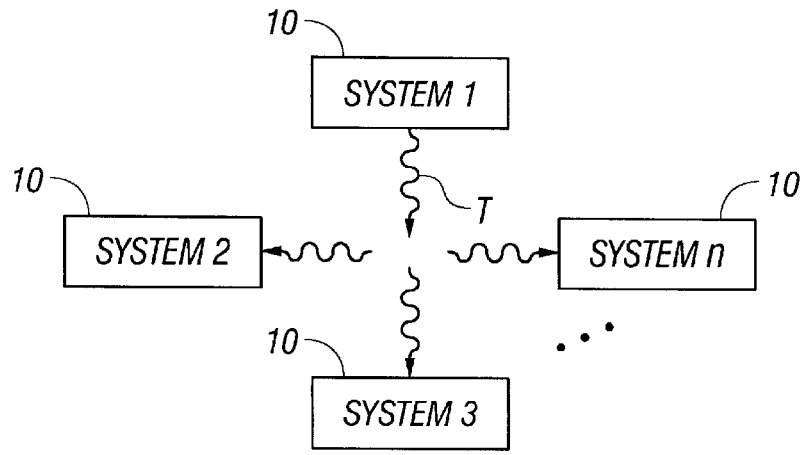
FIG. 6 is a schematic view of a plurality of communication systems, particularly illustrating a transmission scenario in which one of the systems is originating a transmission.
Figure 7:
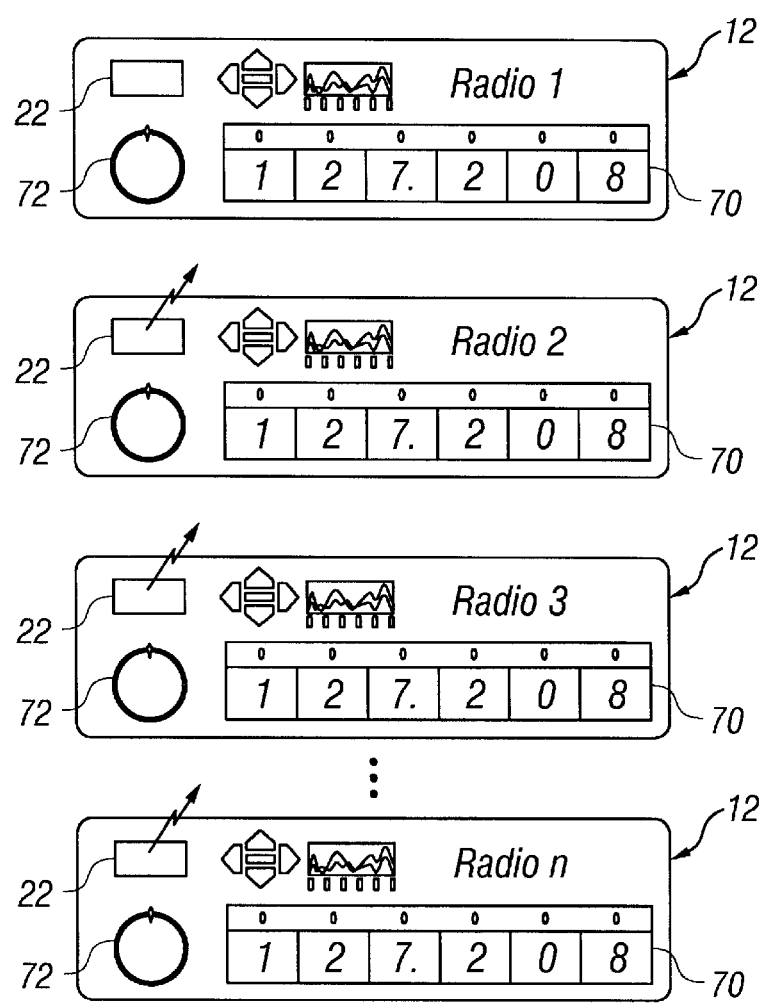
FIG. 7 is a schematic view of a plurality of radios of the present invention corresponding to the transmission scenario of FIG. 6.

An example of a typical transmission scenario is shown in FIG. 6 in which a plurality of communication systems 10 (i.e., 1, 2, 3, . . . , n) of the present invention are shown. FIG. 7 illustrates a plurality of radios 12 (i.e., 1, 2, 3, . . . , n) corresponding to the systems 10 of FIG. 6. The plurality systems 10 may include any number of aircraft, a control tower, or other half-duplex communication entity. In addition to the indicator 22 as described above, each of the radios 12 may include a frequency display 70 for displaying a selected transmission frequency and a frequency selector knob 72 for adjusting the transmission frequency.

In the scenario shown in FIG. 6, one transmission is taking place, so there is no interference. More specifically, system 1 is originating a transmission (indicated by signal T) which is received by each of the other systems (i.e., 2, 3, . . . , n). In accordance with the foregoing description, the indicator 22 of the radio 12 corresponding to the system that originated the transmission (i.e., radio 1) is not activated. However, the indicators 22 of the radios 12 corresponding to each of the other systems (i.e., radio 2, radio 3, . . . , radio n) are activated (e.g., illuminated), indicating that a transmission is taking place. The operators of radios 2, 3, . . . , n accordingly know to refrain from transmitting on the current frequency until the indicators 22 of their radios deactivate.

Figure 8:
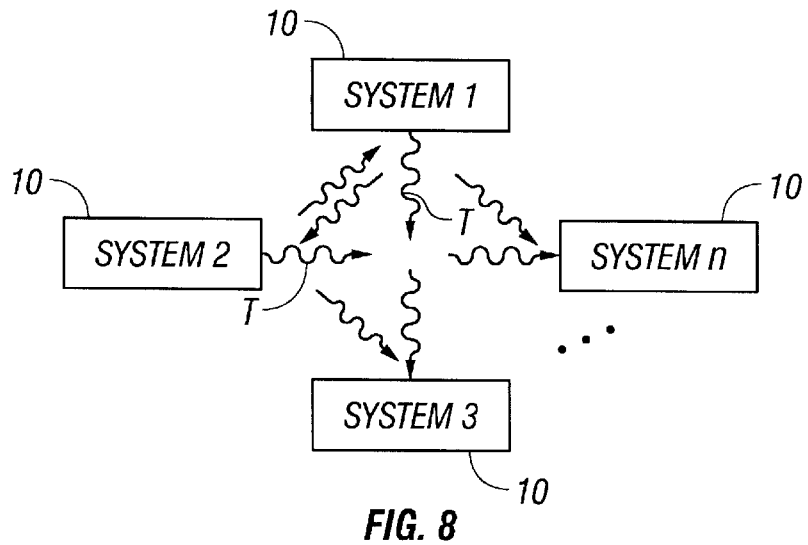
FIG. 8 is a schematic view of a plurality of communication systems, particularly illustrating another transmission scenario in which two of the systems are each originating a transmission.
Figure 9:
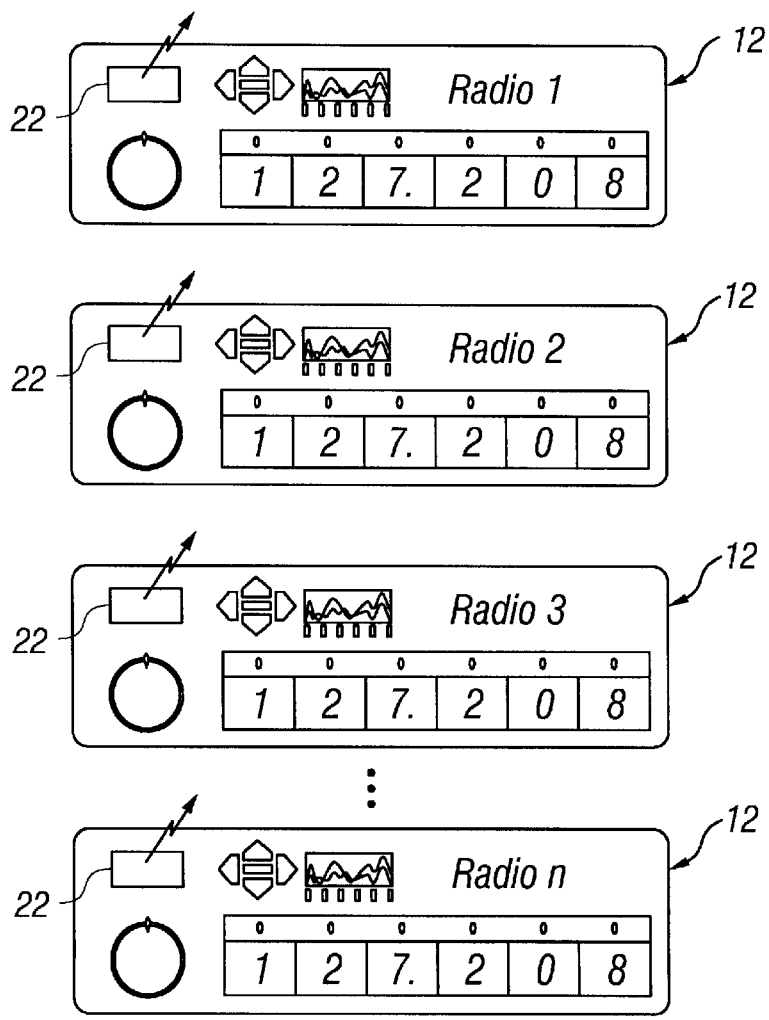
FIG. 9 is a schematic view of a plurality of radios of the present invention corresponding to the transmission scenario of FIG. 8.

Another scenario is shown in FIGS. 8 and 9. FIG. 8 illustrates a scenario in which two transmissions are taking place simultaneously on the same frequency, so there is interference. More specifically, systems 1 and 2 are each originating a transmission (indicated by signals T). Each of the other systems (i.e., 3, . . . , n) receive both transmissions. Systems 3-n accordingly hear garbled information. In addition, system 1 receives the transmission originated by system 2, and system 2 receives the transmission originated by system 1, although the operators of systems 1 and 2 may not hear the respectively received transmission. However, as shown in FIG. 9, the indicators 22 of the radios 12 of each of the systems are activated. The operators of systems 1 and 2 accordingly know that another transmission is taking place while they are making a transmission. The operators then know to stop transmitting and to wait until the indicator 22 on their radio 12 deactivates before retransmitting.

From the foregoing description of the present invention, those skilled in the art will appreciate that exemplary visual-warning circuitry 20 may be configured as an integral module or component of newly manufactured aircraft radios or control-tower radios for sale on the market. Alternatively, the visual-warning circuitry 20 may be configured as a separate module or component which can be retrofitted to existing transceivers or radios in aircraft and in control towers. Those skilled in the art will also appreciate that many modifications to exemplary circuitry 20 are possible. For example, indicator 22 may be an audio indicator rather than a visual indicator as some pilots or controllers may desire. Alternatively, indicator 22 may provide text and/or graphics. In addition to the aircraft application described above, the present invention may be applied to radios utilized by law enforcement agencies, medical emergency and fire dispatchers, or any other radio that falls within Federal Communication Commission (FCC) regulation.

Those skilled in the art will understand that the present invention is not limited to the specifically illustrated and described embodiments above. The scope of the present invention is determined by the terms of the appended claims and their legal equivalents, rather than by the examples described above.

What is claimed is:

1. A radio for a half-duplex communication system, said radio comprising:

an antenna for receiving a remote signal and for transmitting a local signal, said remote signal and said local signal each including a voice signal and a beacon signal;

a transceiver for providing said voice signal of said local signal; and a warning circuit connected to said antenna and said transceiver, said warning circuit including:

a power splitter for receiving said remote signal from said antenna, said power splitter dividing said remote signal into said voice signal and said beacon signal and providing said voice signal of said remote signal to said transceiver;

a power detector connected to said power splitter and for receiving said beacon signal, said power detector providing a DC output that is proportional to said level of said beacon signal;

a comparator connected to said power detector for receiving said DC output, comparing a level of said DC output with a reference, and providing an output when said level of said DC output is greater than said reference; and an indicator for activating when said comparator provides said output;

said power detector being configured so that said DC output is lower than said reference in the absence of said beacon signal and greater than said reference in the presence of said beacon signal.

2. A radio as claimed in claim 1 wherein said warning circuit includes a pulse generator for providing said beacon signal.

3. A radio as claimed in claim 2 wherein said warning circuit includes a combiner connected to said pulse generator and said transceiver for combining said beacon signal with said voice signal provided by said transceiver to provide said local signal to said antenna.

4. A radio as claimed in claim 1 further comprising a handset with a switch connected to said transceiver;

said radio being in receive mode when said switch is not activated and in transmit mode when said switch is activated;

said transceiver providing said local voice signal when said radio is in said transmit mode.

5. A radio as claimed in claim 4 wherein said warning circuit includes a switch connected to said antenna for providing said remote signal to said power splitter when said radio is in said receive mode.

6. A radio as claimed in claim 6 wherein said warning circuit includes a power splitter connected to said antenna for providing said remote signal to said comparator when in said transmit mode.

7. A radio as claimed in claim 1 wherein said warning circuitry includes a band-pass filter for limiting the frequency of said remote signal to a predetermined range.

8. A radio as claimed in claim 7 wherein said predetermined range is substantially equal to a current allocated air-traffic bandwidth.

9. A radio as claimed in claim 8 wherein said predetermined range is from about 118 MHz to about 136 MHz.

10. A radio as claimed in claim 1 wherein said voice signal has a carrier frequency and said beacon signal has a frequency substantially equal to the sum of said carrier frequency and an offset frequency.

11. A radio as claimed in claim 10 wherein said offset frequency is substantially equal to a fraction of a current allocated voice-channel bandwidth.

12. A radio as claimed in claim 10 wherein said offset frequency is about 8.33 kHz.

13. A radio as claimed in claim 10 wherein said carrier frequency is in a range from about 118 MHz to about 136 MHz.

14. A method for indicating a transmission in a half-duplex communication system, said method comprising the steps of:

receiving a remote signal including a voice signal and a beacon signal;

dividing said remote signal into said voice signal and said beacon signal;

providing a DC output that is proportional to a level of said beacon signal;

comparing a level of said DC output with a reference; and signaling when said level of said DC output is greater than said reference.

15. A method as claimed in claim 14 wherein said signaling step comprises the step of:

activating an indicator.

16. A method as claimed in claim 14 further comprising the steps of:

transmitting a local signal including a voice signal and a beacon signal.

17. A half-duplex communication system comprising:

a plurality of radios, each said radio including:
  (a) an antenna for receiving a remote signal and for transmitting a local signal, said remote signal and said local signal each including a voice signal and a beacon signal;
  (b) a transceiver for providing said voice signal of said local signal; and
  (c) a warning circuit connected to said antenna and said transceiver, said warning circuit including:
    (1) a power splitter for receiving said remote signal from said antenna, said power splitter dividing said remote signal into said voice signal and said beacon signal and providing said voice signal of said remote signal to said transceiver;
    (2) a power detector connected to said power splitter and for receiving said beacon signal, said power detector providing a DC output that is proportional to said level of said beacon signal;
    (3) a comparator connected to said power detector for receiving said DC output, comparing a level of said DC output with a reference, and providing an output when said level of said DC output is greater than said reference; and
    (4) an indicator for activating when said comparator provides said output, said power detector being configured so that said DC output is lower than said reference in the absence of said beacon signal and greater than said reference in the presence of said beacon signal;

whereby said indicator of each said radio receiving a remote signal with a beacon signal having a level greater than a reference, is activated to indicate that a transmission is taking place within said communication system.

18. A system as claimed in claim 17 wherein at least one of said radios is disposed in an aircraft.

* * * * *